US008341609B2

(12) United States Patent
Lee et al.

(10) Patent No.: US 8,341,609 B2
(45) Date of Patent: Dec. 25, 2012

(54) CODE GENERATION IN THE PRESENCE OF PAGED MEMORY

(75) Inventors: Robert H. Lee, Sunnyvale, CA (US); David Unietis, San Francisco, CA (US); Mark Jungerman, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1414 days.

(21) Appl. No.: 11/698,638

(22) Filed: Jan. 26, 2007

(65) Prior Publication Data

US 2008/0184195 A1 Jul. 31, 2008

(51) Int. Cl.
*G06F 9/44* (2006.01)
*G06F 9/45* (2006.01)
*G06F 9/26* (2006.01)

(52) U.S. Cl. ........ 717/141; 717/145; 717/148; 717/151; 717/161; 711/202; 711/207

(58) Field of Classification Search .................. None
See application file for complete search history.

(56) References Cited

U.S. PATENT DOCUMENTS

| 4,588,985 | A | | 5/1986 | Carter et al. | |
|---|---|---|---|---|---|
| 5,051,893 | A | * | 9/1991 | Tenny et al. | 717/141 |
| 5,301,327 | A | * | 4/1994 | McKeeman et al. | 717/145 |
| 5,325,531 | A | * | 6/1994 | McKeeman et al. | 717/145 |
| 5,504,885 | A | | 4/1996 | Alashqur | |
| 5,539,899 | A | * | 7/1996 | Huynh et al. | 711/171 |
| 5,696,927 | A | * | 12/1997 | MacDonald et al. | 711/207 |
| 5,768,593 | A | * | 6/1998 | Walters et al. | 717/141 |
| 5,887,174 | A | * | 3/1999 | Simons et al. | 717/161 |
| 5,966,536 | A | * | 10/1999 | Ravichandran | 717/153 |
| 6,139,199 | A | * | 10/2000 | Rodriguez | 717/159 |
| 6,205,440 | B1 | | 3/2001 | Nusbickel | |
| 6,263,429 | B1 | * | 7/2001 | Siska | 712/245 |
| 6,292,934 | B1 | * | 9/2001 | Davidson et al. | 717/158 |
| 6,381,740 | B1 | * | 4/2002 | Miller et al. | 717/151 |
| 6,434,685 | B1 | | 8/2002 | Sexton et al. | |
| 6,484,313 | B1 | | 11/2002 | Trowbridge et al. | |
| 6,519,594 | B1 | | 2/2003 | Li | |
| 6,591,355 | B2 | * | 7/2003 | Schuster et al. | 711/202 |

(Continued)

OTHER PUBLICATIONS

Greg Wright et al. "An object-aware memory architecture" [Online], 2005, pp. 1-34, [Retrieved from Internet on Jan. 24, 2012], <http://delivery.acm.org/10.1145/1700000/1698178/smli_tr-2005-143.pdf>.*

(Continued)

*Primary Examiner* — Thuy Dao
*Assistant Examiner* — Ziaul A Chowdhury
(74) *Attorney, Agent, or Firm* — Silicon Valley Patent Group LLP; Omkar Suryadevara

(57) ABSTRACT

A computer is programmed to automatically identify multiple sequences of executable code such that each sequence fits within a page of memory. When the executable code comprising several sequences is loaded into the paged memory, each sequence is placed in its own page. The computer is further programmed to prepare a number of structures which identify a corresponding number of instructions that transfer control between sequences. Each structure identifies at least a control transfer instruction in one sequence and a target in another sequence. When loading the sequences into memory, the structures are used to replace destination addresses of control transfers between sequences with new addresses derived from base addresses of pages that have been allocated in memory to hold the sequences.

24 Claims, 11 Drawing Sheets

U.S. PATENT DOCUMENTS

| | | |
|---|---|---|
| 6,782,532 B1 | 8/2004 | Sexton et al. |
| 6,829,761 B1 | 12/2004 | Sexton et al. |
| 6,854,114 B1 | 2/2005 | Sexton et al. |
| 6,973,646 B1 | 12/2005 | Bordawekar et al. |
| 7,032,216 B1 | 4/2006 | Nizhegorodov |
| 7,181,736 B2* | 2/2007 | Douceur et al. ............... 717/151 |
| 7,617,496 B2* | 11/2009 | Gonion ......................... 717/161 |
| 7,788,314 B2 | 8/2010 | Holt |
| 7,958,176 B2* | 6/2011 | Douceur et al. ............... 708/300 |
| 2001/0047436 A1 | 11/2001 | Sexton et al. |
| 2002/0112226 A1 | 8/2002 | Brodersen et al. |
| 2002/0144240 A1 | 10/2002 | Lueh et al. |
| 2003/0005419 A1* | 1/2003 | Pieper et al. .................. 717/141 |
| 2003/0093778 A1 | 5/2003 | Bak et al. |
| 2003/0159134 A1* | 8/2003 | Souloglou et al. ............ 717/148 |
| 2004/0003380 A1 | 1/2004 | Fedorov |
| 2004/0019886 A1 | 1/2004 | Berent et al. |
| 2004/0031022 A1 | 2/2004 | Kabasawa et al. |
| 2004/0044995 A1 | 3/2004 | Hickson |
| 2004/0054994 A1 | 3/2004 | Demsey et al. |
| 2004/0168028 A1 | 8/2004 | Cierniak |
| 2004/0168162 A1 | 8/2004 | Park et al. |
| 2004/0210865 A1 | 10/2004 | Shimura |
| 2004/0230958 A1 | 11/2004 | Alaluf |
| 2004/0243989 A1 | 12/2004 | Owens et al. |
| 2006/0048114 A1* | 3/2006 | Schmidt ........................ 717/148 |
| 2006/0206884 A1 | 9/2006 | Creamer et al. |
| 2006/0247908 A1* | 11/2006 | Douceur et al. ............... 703/22 |
| 2007/0006189 A1* | 1/2007 | Li et al. ........................ 717/141 |
| 2007/0061787 A1 | 3/2007 | Trowbridge |
| 2008/0034355 A1* | 2/2008 | Shen et al. .................... 717/148 |

OTHER PUBLICATIONS

Udo W. Pooch "A Dynamic Clustering Strategy in a Demand Paging Environment", [Online], 1976, pp. 1-13, [Retrieved from Internet on Jan. 24, 2012], <http://delivery.acm.org/10.1145/810000/807296/p11-pooch.pdf>.*

Andhi Janapsatya et al. "A Novel Instruction Scratchpad Memory Optimization Method based on Concomitance Metric" [Online], 2006, pp. 612-617, [Retrieved from Internet on Jan. 24, 2012], <http://delivery.acm.org/10.1145/1120000/1118443/p612-janapsatya.pdf>.*

Joseph P. Moran, "SunOS Virtual Memory Implementation", [Online], 1988, pp. 1-17, [Retrieved from Internet on Jan. 24, 2012], <http://citeseerx.ist.psu.edu/viewdoc/download?doi=10.1.1.37.8484&rep=rep1&type=pdf>.*

Oracle® Database, Java Developer's Guide, 10g Release 1 (10.1), Part No. B12021-02, Jun. 2004, 218 pages Dmitriev, M. "Towards Flexible and Safe Technology for Runtime Evolution of Java Language Applications", In Proceedings of the Workshop on Engineering Complex Object—Oriented Systems for Evolution, in association with OOPSLA 2001 International Conference, 8 pages.

Developing Stored Procedures In Java™, An Oracle Technical White Paper, Apr. 1999, 19 pages.

Oracle8i, Java Stored Procedures Developer's Guide, Release 2 (8.1.6), Part No. A81358-01, Dec. 1999, 122 pages.

Non Final Rejection dated Aug. 19, 2010 in U.S. Appl. No. 11/698,629, 13 pages.

Amendment/Req. Reconsideration—After Non-Final Reject (1page), Specification (3 pages), Claims (3 pages) and Applicant Arguments/Remarks (6 pages) as filed in an Amendment dated Nov. 19, 2010 in U.S. Appl. No. 11/698,629.

Non-Final Rejection dated Nov. 9, 2010 in U.S. Appl. No. 11/698,634, 15 pages.

Final Rejection dated Feb. 11, 2011 in U.S. Appl. No. 11/698,629, 16 pages.

Amendment/Req. Reconsideration—After Non-Final Reject (1page), Specification (3 pages), Claims (4 pages) and Applicant Arguments/Remarks (11 pages) as filed in an Amendment dated Mar. 9, 2011 in U.S. Appl. No. 11/698,634.

U.S. Appl. No. 11/698,629.

U.S. Appl. No. 11/698,634.

Amendment dated Jun. 13, 2011 in U.S. Appl. No. 11/698,629, (11 pages).

Notice of Allowance dated Jun. 2, 2011 in U.S. Appl. No. 11/698,634 (20 pages).

"Enhancing Source-Level Programming Tools With An Awareness of Transparent Program Transformations", Myoungdyu Song et al., Oct. 2009, pp. 301-319.

"Anatomy of a Native XML Base Management System", Thorsten Fiebig et al., 2002, pp. 1-23.

"Integrating Programming Languages & Databases: What's the Problem", William R. Cook et al., 2005, pp. 1-18.

"Orthogonal Persistence As an Implementation Platform for Software Development Environments", G.N.C. Kirby et al., 1997, pp. 1-12.

Applicant's Interview Summary dated Sep. 2, 2011 in U.S. Appl. No. 11/698,634, p. 1.

* cited by examiner

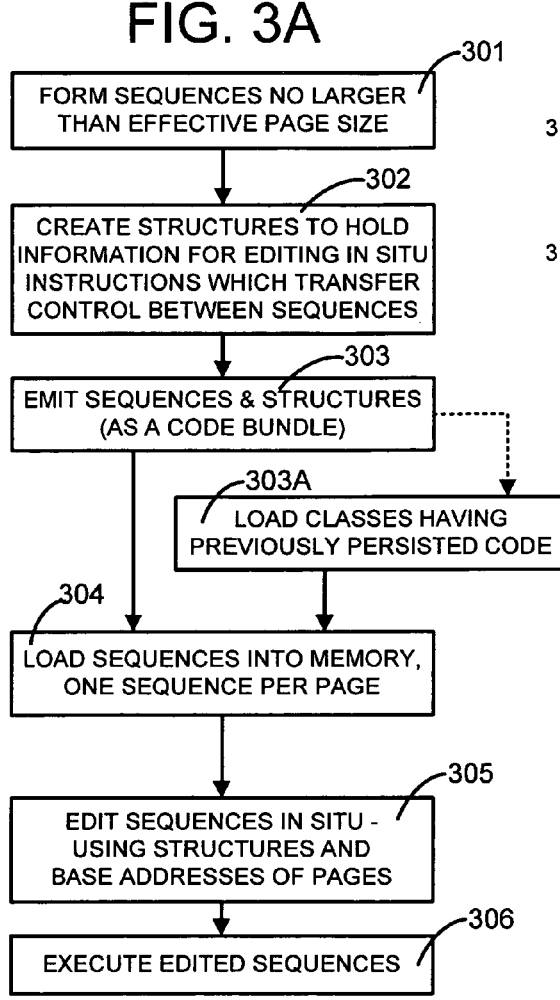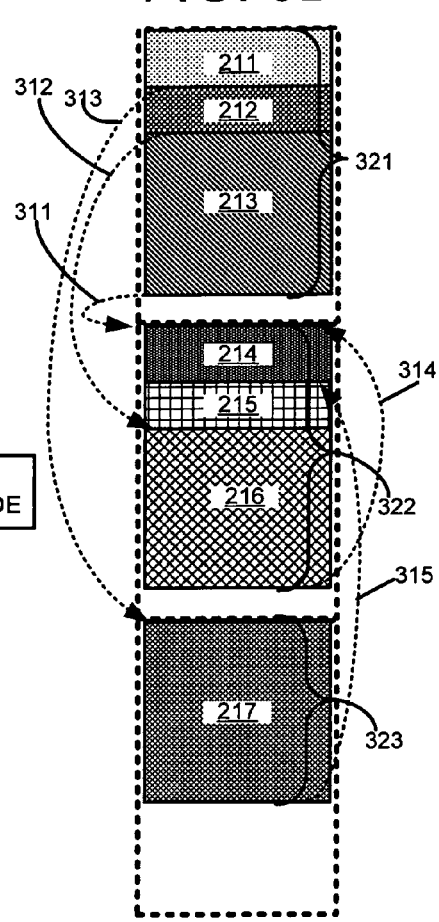

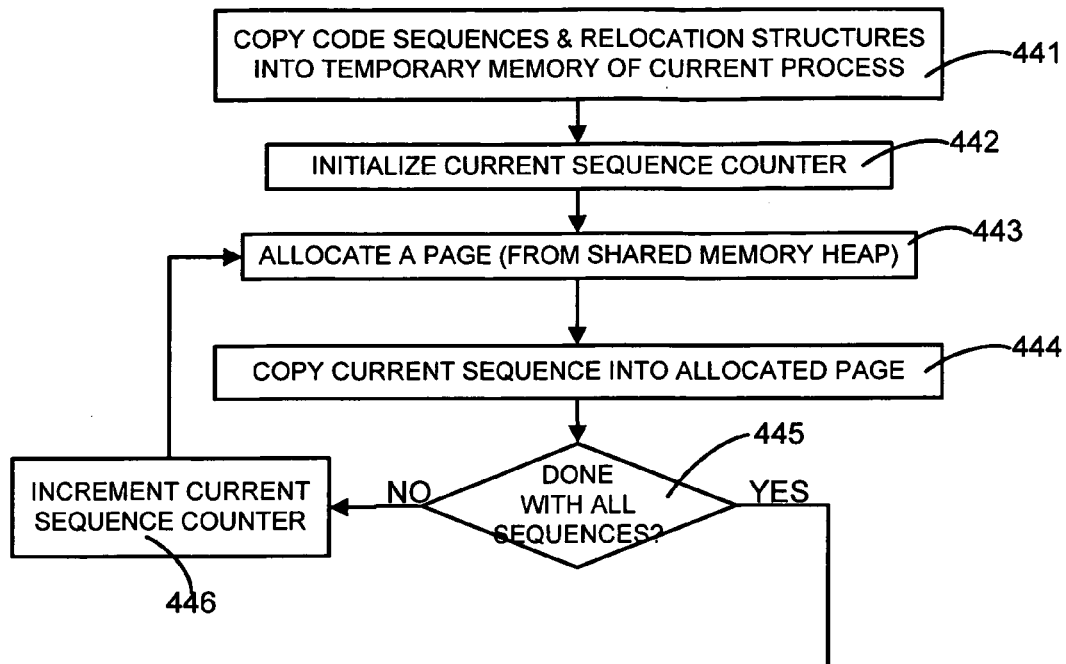
FIG. 4C
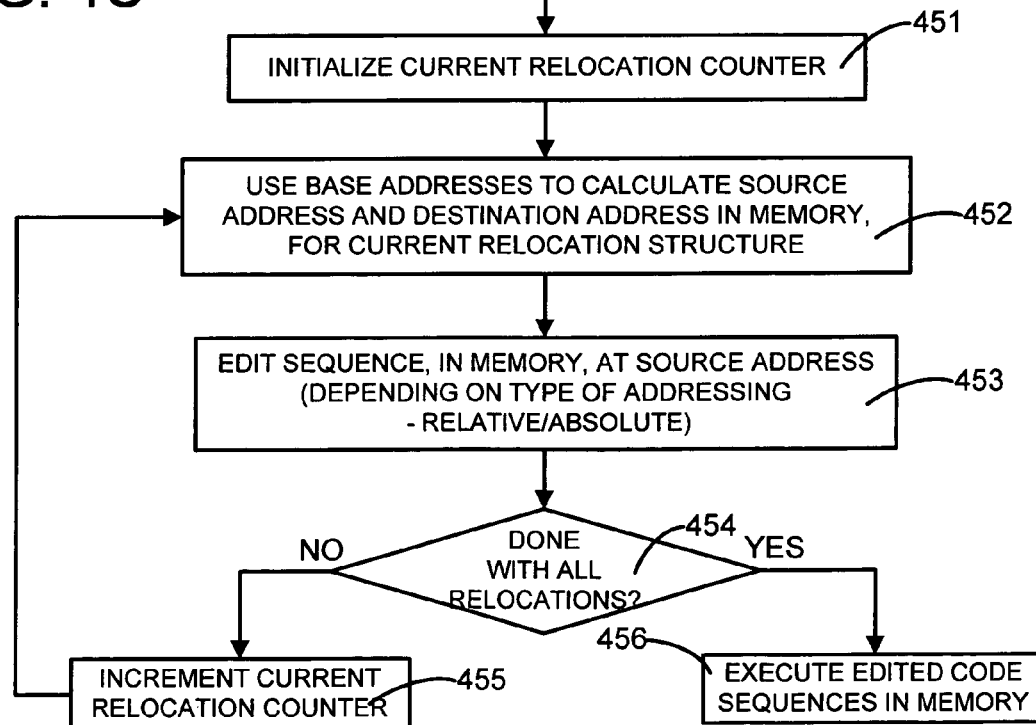

CODE GENERATION IN THE PRESENCE OF PAGED MEMORY

CROSS-REFERENCE TO RELATED APPLICATIONS

This application is related to and incorporates by reference herein in its entirety, a commonly-owned and concurrently filed U.S. application Ser. No. 11/698,629, entitled "ASYNCHRONOUS DYNAMIC COMPILATION BASED ON MULTI-SESSION PROFILING TO PRODUCE SHARED NATIVE CODE" by Robert H. Lee et al.

This application is also related to and incorporates by reference herein in its entirety, a commonly-owned and concurrently filed U.S. application Ser. No. 11/698,634, entitled "CODE PERSISTENCE AND DEPENDENCY MANAGEMENT FOR DYNAMIC COMPILATION IN A DATABASE MANAGEMENT SYSTEM" by Robert H. Lee et al., now issued as U.S. Pat. No. 8,037,460.

BACKGROUND

U.S. Pat. No. 6,854,114 granted to Harlan Sexton et al is incorporated by reference herein in its entirety, as background. In this patent, Sexton describes multiple VM instances accessing a shared area. Referring to FIG. 1A attached hereto, three clients have established three sessions through a server. In session 1, a call that involves services provided by the virtual machine is currently being processed by a system thread using VM instance 1. In session 3, a call that involves services provided by the virtual machine is currently being processed by a system thread using VM instance 3. Both VM instance 1 and VM instance 3 share access to the shared state area, which in the illustrated embodiment includes data for Java class X. In session 2, no call is currently active. The call memory associated with any previous call has been discarded. Only the session memory of VM instance 2 remains allocated. Because session 2 is not currently processing a call that makes use of VM instance 2, VM instance 2 is not currently assigned to any system thread. The various VM instances instantiated within the server may actually be created and run in either separate processes, or using system threads.

VM instances of the type described above typically use a Java virtual machine interpreter (such as interpreter 110 in FIG. 1B) which is responsible for interpreting Java byte codes. FIG. 1B is described in U.S. Pat. No. 7,032,216 granted to Dmitry Nizhegorodov, which patent is hereby incorporated by reference herein in its entirety, as background. In this patent, Nizhegorodov states that, in addition to the byte codes, a native compiler produces translated code 120, which is also loaded in the virtual machine. Preferably, the translated code 120 is configured to interact with interpreter 110 to support an execution model that mixes byte-interpreted and natively compiled classes. Thus, routines in translated code 120 may call routines that are interpreted, and interpreted routines may call translated code 120 routines, thereby providing call interoperability. Virtual machine services 130 are provided for supplying such services as dynamic memory management and garbage collection. Translated code 120 is generated to use the API of virtual machine services 130 (which is used by interpreter 110) by passing the context parameter or handle to the routines of the virtual machine services 130.

Run-time environment 140 of FIG. 1B provides base functionality of the virtual machine, interfacing with the underlying operating system and relational database system. Run-time environment 140 may also include a meta-object system such as that described in U.S. Pat. No. 6,782,532 granted to Sexton, et al., which patent is also hereby incorporated by reference herein in its entirety, as background. Accordingly, translated code 120 is configured to interact with run-time environment 140 in the same way as virtual machine services 130, for example by laying out objects in the same way and using the same meta-object system.

Runtime environment 140 of the type described above is normally responsible for managing memory for objects that are created and destroyed during the execution of a program. Hence, runtime environment 140 may be built to use a memory management system that is paged, as described in U.S. Pat. No. 6,434,685 granted to Sexton, et al., which patent is hereby incorporated by reference herein in its entirety, as background. However, a paged memory is difficult to use with translated code that requires contiguous memory, as discussed next. Translated code 120 is typically produced from a number of basic blocks 211-217 (FIG. 2A) that are normally laid out contiguously one after another. The layout (FIG. 2B) is typically frozen so it can be shared among multiple users. When using a paged memory management system, translated code 120 which is larger than the size of a single page, requires allocation of contiguous pages 201-203 so as to preserve one or more control transfers 221-224. As contiguous pages 201-203 (FIG. 2C) are typically not available, their allocation for holding translated code 120 is an issue.

One technology employed by several Java Virtual Machines (JVMs) to run Java code is dynamic compilation, which is also called Just-in-Time (JIT) compilation. In such a scenario, Java bytecodes are compiled into native machine code, on demand. This allows Java bytecodes to be interpreted by the JVM until they are found to be heavily used at which time they are compiled by the JIT compiler. However, to the inventors knowledge, each instantiation of a Java application of several prior art systems runs in its own process, and as such each process has it's own copy of any native machine code which has been compiled during the course of that VM instance. While having process-private copies of compiled code is simpler, it does not scale well. To share compiled code, it can be loaded by runtime environment 140 if smaller than a page. However, compiled code is typically larger than a page and cannot be loaded, because multiple contiguous pages are not available during normal operation.

SUMMARY

In accordance with the invention, a code generator (in a compiler that executes in a computer) is programmed to automatically prepare multiple sequences of executable code such that each sequence fits within a page of fixed size in memory. Depending on the embodiment, such a page may have a single fixed size, or one of two fixed sizes, or one of a predetermined set of fixed sizes. In addition to preparing sequences of code that fit within a page, the code generator is further programmed to prepare a number of structures (also called "relocation structures") which identify a corresponding number of instructions that transfer control between sequences. Each relocation structure identifies a sequence of code and an offset therein at which a control transfer instruction is located, and further identifies a destination instruction (to which control is to be transferred) in a different sequence of code. The code generator is programmed to emit the relocation structures in addition to the multiple sequences of code. A memory encoded with information comprising relocation structures and multiple code sequences supports in-situ editing of the code sequences whenever they are loaded into memory for execution.

Specifically, when the just-described executable code, in the form of multiple code sequences, is loaded into memory, each code sequence is placed in its own page by a code loader. Before execution begins, the code loader uses the relocation structures to in-situ edit the code sequences at run time, i.e. edit the code sequences at the locations in memory from which they are then executed. During such editing, the code loader replaces any pre-existing destination addresses (that were created by the code generator at compile time) to which control was to be transferred, with new addresses that are computed from base addresses of pages that are allocated to hold the code sequences.

Forming sequences of code that are no larger than a page, and editing the code sequences in situ at run time before execution overcomes the problem of using non-contiguous pages to hold executable code. Therefore, code loaders of the type described above use executable code suitably sequenced by a code generator of the type described above, even though available pages are scattered in memory (i.e. not contiguous). Note that the code sequences and the relocation structures can be loaded in any memory, which memory may be located within a computer that performed the compilation (e.g. a "server"), or memory from which code is to be executed by a computer (e.g. a "client"), or even in memory of a different computer that receives the information from a server and prepares code for execution by a client, depending on the embodiment.

BRIEF DESCRIPTION OF THE DRAWINGS

FIG. 3A illustrates, in a high-level flow chart, a method in accordance with the invention, that emits a bundle containing code sequences and structures which hold editing information, loads the code sequences into individual pages, and edits the code sequences in memory using information from the structures and base addresses of pages that are allocated to hold the code sequences.

FIG. 3B illustrates, sequences of executable code, each of which is sized in accordance with the invention to be less than a fixed size of space effectively available in a page in memory.

FIG. 3C illustrates, in a block diagram, a number of relocation structures also in accordance with the invention, which are to be used to edit the sequences of FIG. 3B when being loaded into memory, prior to execution thereof.

FIG. 4C illustrates, in a flow chart, a method that is performed in certain embodiments, to load into memory the sequences of FIG. 4B and to edit each sequence as specified in relocation structures (if any) associated with the sequence.

DETAILED DESCRIPTION

In accordance with the invention, a computer is programmed to automatically perform an act 301 in FIG. 3A in a code generator (which is a part of a compiler) to form a number of sequences of machine instructions ("code sequences") that are no larger than an effective size of a page. The effective size of a page is a fixed page size which has been reduced by any amount of memory that is not available to hold machine instructions. In some embodiments, the just-described unavailable memory is reserved for jump instructions (used to transfer control between pages). Specifically, such embodiments use memory at the end of each page to hold one or more absolute jump instructions which re-direct relative addressing jumps that would otherwise fail when the target becomes too distant (due to non-contiguous page allocation). The amount of memory used by such jumps can be of a fixed amount selected based on empirical data or alternatively of a variable amount selected depending on the number of inter-page jumps in the code sequence being placed in a current page. Note that specific values of page size, reserved memory, and effective page size are not critical aspects of the invention, although certain illustrative sizes are discussed next.

For example, if page size is 4 Kbytes (i.e. 4096 bytes) and if 128 bytes are reserved for the jump table, then effective page size is 3968 bytes. Note that other embodiments may reserve space on a page for other uses and the size of such space must also be used to reduce the effective page size. If the amount of memory not available to hold machine instructions is zero then the effective page size is same as the actual page size. In one example, an entire code sequence fits in a single page and contains no transfer of control between pages so that the entire page can be used. In another example, all control transfers between pages use absolute addressing of their respective targets, and hence no jump table is required. Note that although some embodiments use 4 KB pages, other embodiments may use pages of other sizes, such as 64 KB pages and/or 256 MB pages. Embodiments of the type described herein can also use pages of multiple sizes, e.g. one embodiment uses two page sizes ("big" and "small"), and therefore code sequences are prepared to fit in either a small page or a big page.

Figure 2A:
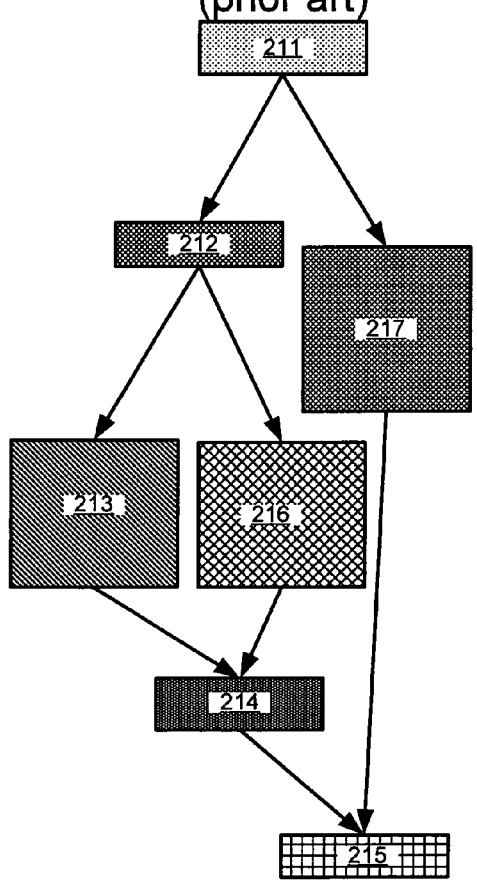
FIG. 2A illustrates, a group of basic blocks obtained by compiling software, in the prior art.
Figure 2B:
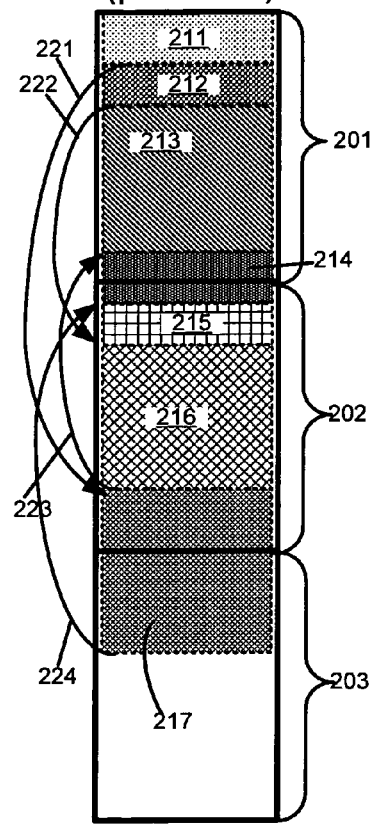
FIG. 2B illustrates a prior art layout of the basic blocks of FIG. 2B, regardless of page boundaries.
Figure 2C:
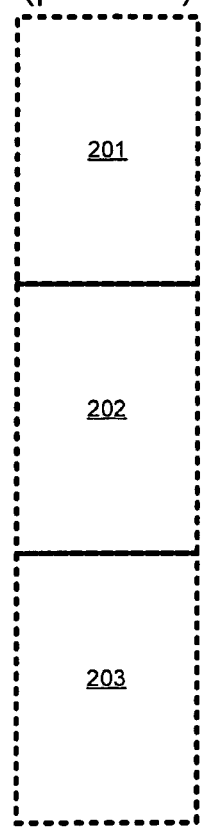
FIG. 2C illustrates, a prior art collection of contiguous pages in memory which are required to load executable code having the layout of FIG. 2B.

Performance of act 301 is described next using the illustration of basic blocks shown in FIG. 2A. Specifically, one embodiment of a computer prepares a sequence 321 (FIG. 3B) which contains only three blocks 211, 212 and 213 because these blocks fit within a page. In this example, block 214 doesn't fit, in its entirety, in the space left over on a page after blocks 211-213 are placed thereon, and therefore this block 214 is used to start a second sequence 322. In addition to block 214, this second sequence 322 further includes blocks 215 and 216 because all three blocks 214-216 can fit within a page. However, block 217 doesn't fit in the space remaining on a page after the second sequence 322 has been placed thereon. For this reason, a third sequence 323 is required for block 217.

Note that in the just-described embodiment, a code generator in the computer is programmed to form sequences by selecting an integral number of basic blocks that fit within a page. In an alternative embodiment, the computer is programmed to form sequences by splitting a basic block across a page boundary and adding a jump instruction in the basic block at the end of the sequence, to reach the remainder of the basic block which is included in a next sequence. Regardless of how the sequences are formed, and regardless of the precise machine instructions that each sequence contains, by virtue of the requirement that each sequence is no larger than a page, the computer has ensured that during loading of executable code into a paged memory, each sequence fits within a page. The issue of available pages being scattered (i.e. non-contiguous) is handled by use of relocation structures to edit destination addresses in the sequences, after locations of the sequences in memory are known, as described below.

Referring to the flow chart in FIG. 3A, the computer is further programmed to create (see act 302 in FIG. 3A) structures which hold information required to edit each transfer of control (such as a jump) between sequences. Control transfer that occurs between sequences is illustrated by a control transfer 313 (FIG. 3B) in the executable code, which causes execution to go from a last instruction in the first block 211 in sequence 321 to the first instruction in the first block 217 in sequence 323. To enable control transfer 313 to be implemented when the executable code is loaded in pages that are not contiguous, the computer creates a structure (such as structures 331-333 and 335 in FIG. 3C) to hold any information that is of use to a code loader to edit the executable code after the executable code is loaded into memory.

Such information includes, for example, the identity of an instruction from which control transfer 313 originates and the identity of another instruction at which control transfer 313 control transfer terminates. The code loader uses the just-described two identities to find the instruction to be edited, and to calculate the destination address to be written therein during editing. In an illustrative embodiment shown in FIG. 3C, this information includes a source sequence number and a source offset (which together identify the precise instruction which is transferring control), and a destination sequence number and a destination offset (which together identify the instruction to which control is being transferred). Hence, for each control transfer 311, 312, 313 and 315 in the executable code that must go between two sequences, the computer is programmed to create a corresponding relocation structure 331, 332, 333 and 335.

Note that there is no relocation structure 334 in FIG. 3C because the corresponding control transfer 314 happens to occur locally, within a single sequence 322 (even though control is transferred between two different basic blocks 216 and 214 they are both in sequence 322). Hence, there are as many relocation structures as there are inter-sequence control transfers in the executable code. A relocation structure of the type shown in FIG. 3C may hold additional information 339, depending on the embodiment, and such additional information of one illustrative embodiment is described in further detail in reference to FIG. 3G. Also depending on the embodiment, a relocation structure may hold different information than shown in FIG. 3C, as discussed next.

In one alternative embodiment, a relocation structure that is prepared by the computer contains source and destination addresses instead of sequence numbers and offsets, and the code loader is programmed to automatically generate sequence numbers and offsets, assuming that all addresses are prepared using a layout in which code sequences are placed in contiguous pages of memory. The just-described assumption can also be used in another alternative embodiment wherein the relocation structure contains the source addresses but not destination addresses, with the code loader being further programmed to look up the destination addresses from the executable code (by extracting targets of instructions at the source addresses). Therefore, the specific information within a relocation structure can differ, depending on the embodiment.

Relocation structures 331-333 and 335 (FIG. 3C) are emitted (as per act 303 in FIG. 3A) together with sequences 321-323 by the code generator of the illustrative embodiment, in a bundle which is also referred to as a "code bundle." The code bundle is thereafter processed by a code loader that performs acts 304 and 305 (FIG. 3A). The code loader runs whenever there is a compiler generated code bundle available to install into memory. In practice, this happens when classes are loaded that have previously persisted code (as per act 308) or after the compiler finishes running and has new code (as per act 303). As shown by a dashed arrow in FIG. 3A, previously persisted code can be created on performance of act 303 at a different time (or alternatively in a different computer) relative to performance of act 304. Note that the code loader runs on behalf of persisted code for classes whenever those class' execution heaps are loaded. Accordingly, it is possible that the code loader will run more than once for a single logical class with persisted code if that class is at some point aged out and back in by the underlying mechanism (of the kernel). The primary responsibility of the code loader is to materialize and write the pages in memory from which code is executed. The sizes of these pages is pre-determined at compile-time depending on how the basic-blocks were laid out.

Figure 1A:
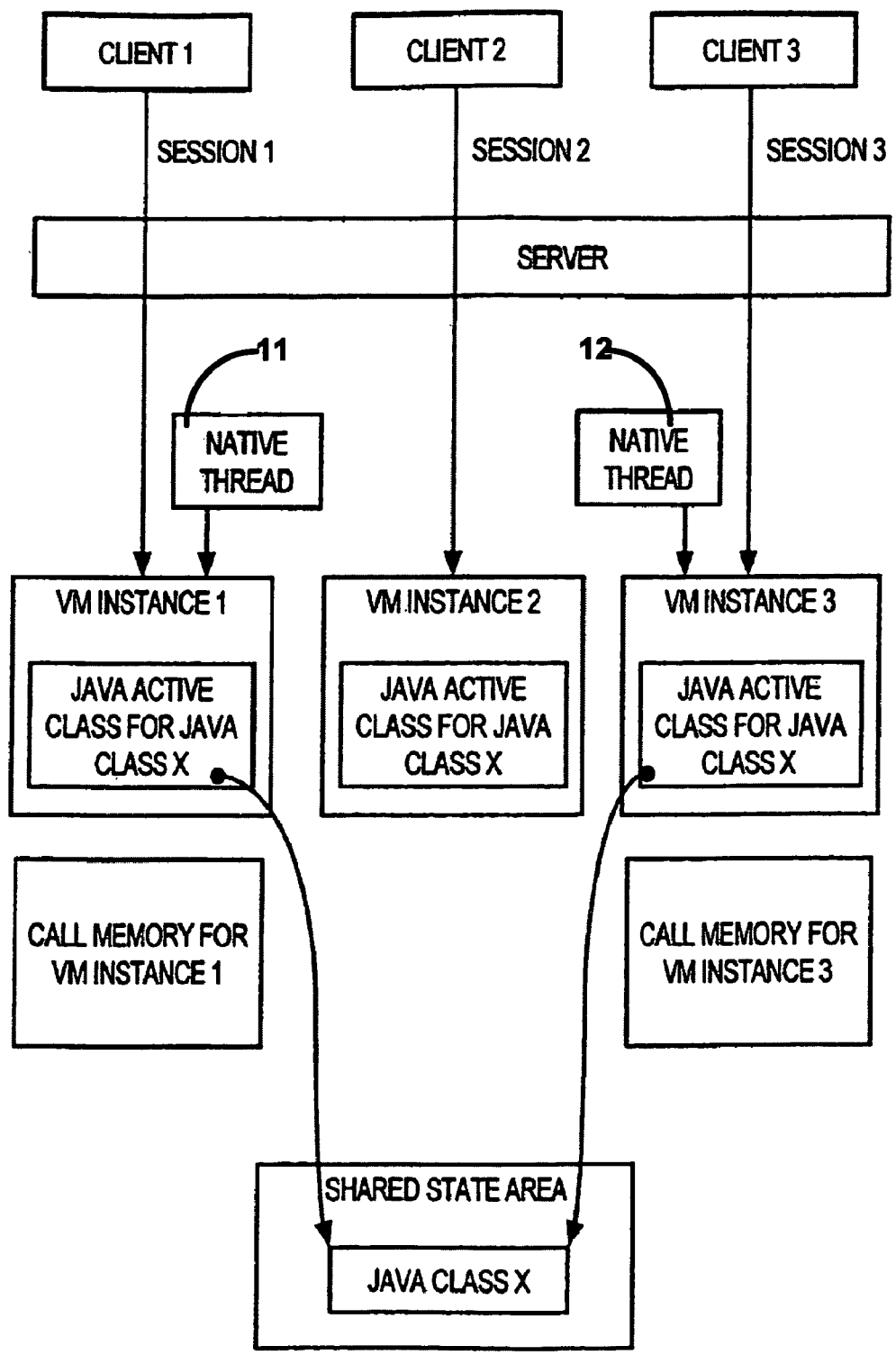
FIGS. 1A and 1B illustrate, in block diagrams, a memory management system and a virtual machine respectively of the prior art.
Figure 1B:
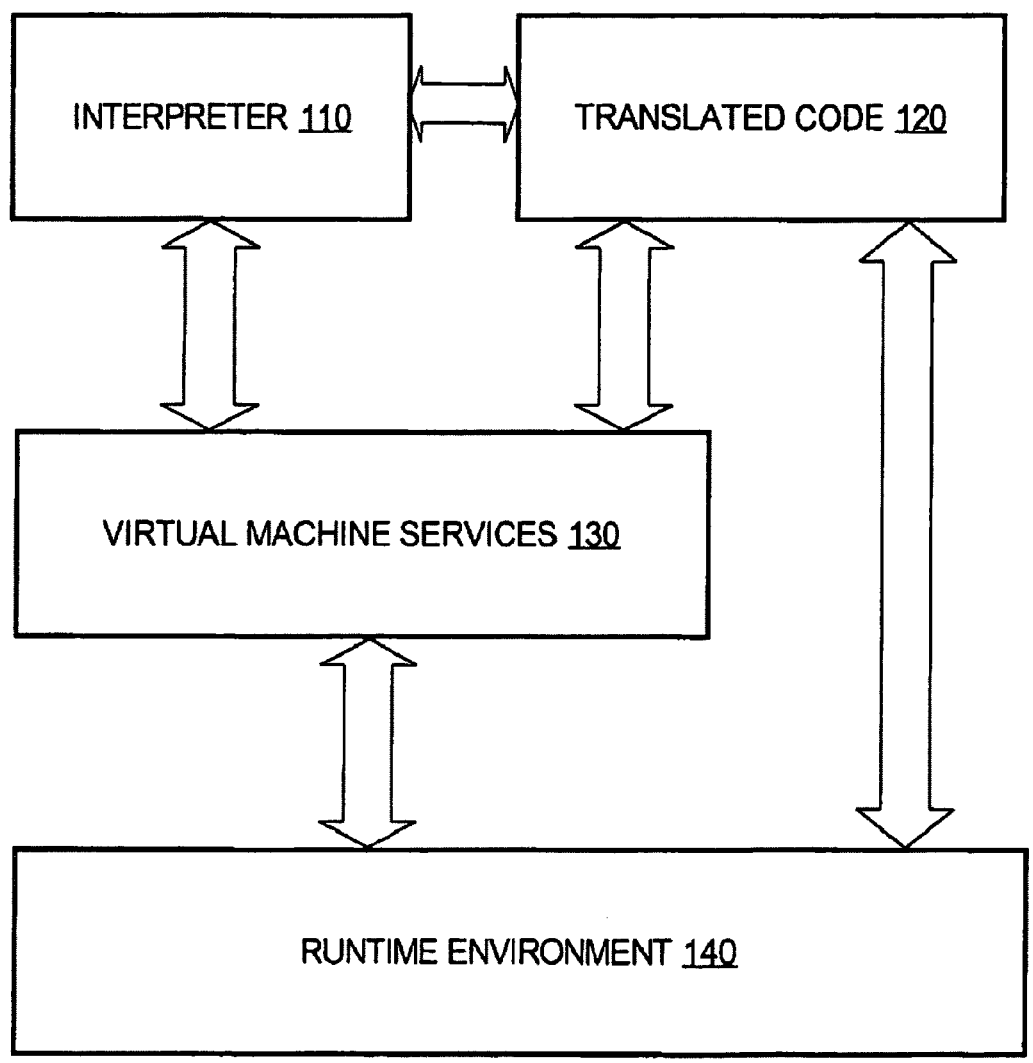

In some embodiments, the code loader selects the memory space from which the pages are allocated to be one whose lifetime is tied to the lifetime of a class for which the code is being installed. Several such embodiments use a data structure called a class object memory (or "class-objmem") to hold metadata for a given class shared across multiple sessions. One embodiment of the code loader simply allocates space for the code-pages directly in the class-objmem itself meaning that the code runs out of shared memory (in one embodiment SGA memory in an ORACLE database) for shared classes (see "shared state area" at the bottom of FIG. 1A) or session-private memory (which is PGA memory in the ORACLE database embodiment) for private classes. Alternative embodiments are general and support execution from other spaces.

Figure 3D:
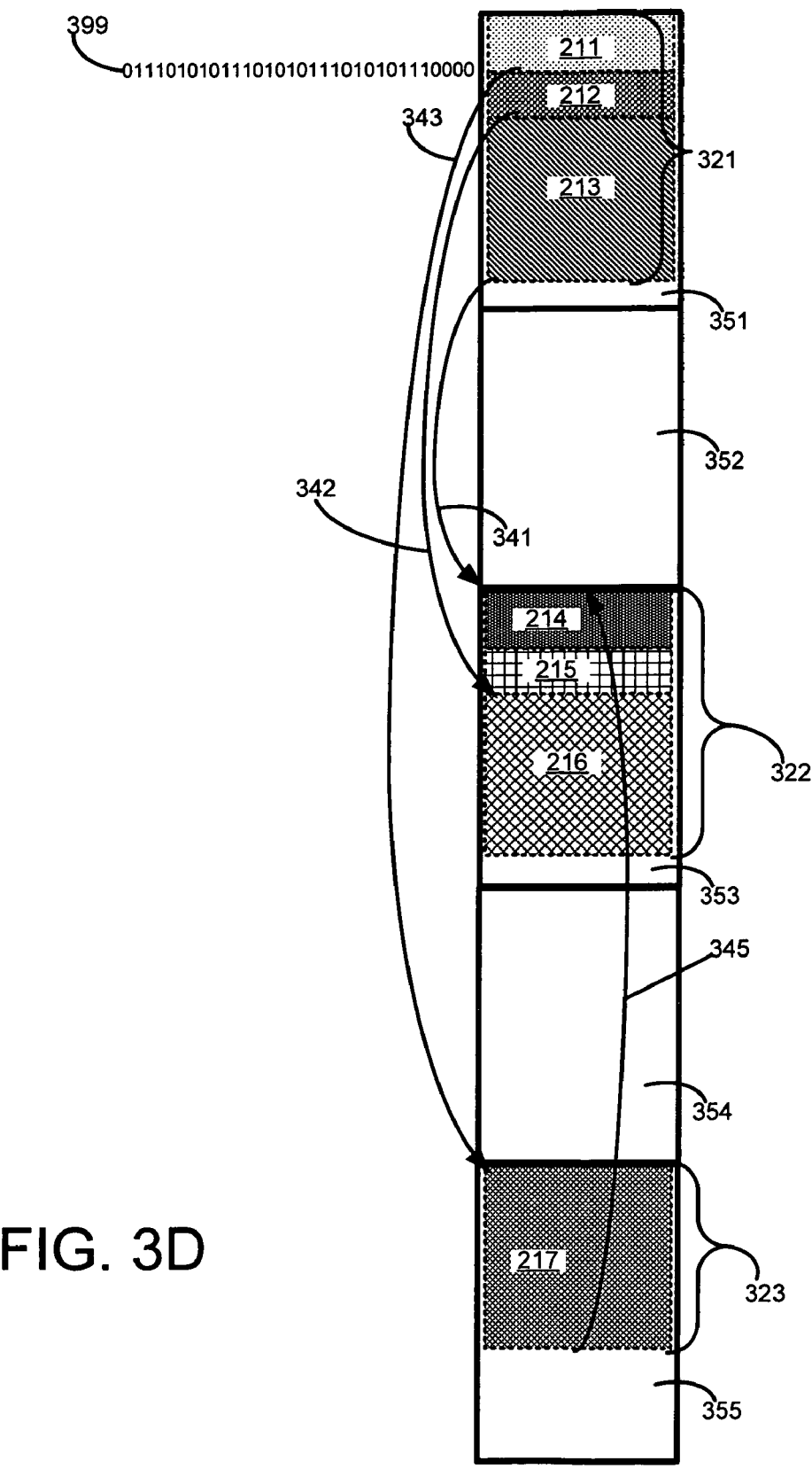
FIG. 3D illustrates, an example of use of non-contiguous pages in memory, to hold the sequences of FIG. 3B.

For example, on performing act 304 (FIG. 3A), a code loader allocates three pages, and receives the base addresses of pages 351, 353 and 355 that happen to be currently available but which are not contiguous as shown in FIG. 3D (assume pages 352 and 354 are otherwise used). In the example, the code loader completes act 304 by loading each sequence into its own individual page, e.g. by copying the three code sequences 321, 322 and 323 from the code bundle into the respective pages 351, 353 and 355 without any special handling (i.e. it is a straight memcpy).

The code loader is further programmed to perform act 305 by replacing each of control transfers 311-313 and 315 (documented in the code bundle in a corresponding relocation structure 331-333 and 335) with the control transfers 341-343 and 345 (FIG. 3D). For example to replace the control transfer 313 with the control transfer 343, the code loader calculates two addresses as follows. The code loader sums up the base address of page 351 and the offset into sequence 321 to calculate as the source address, a memory address at which the last instruction in the first block 211 in sequence 321 is located. This memory address is illustrated in FIG. 3D as being a 32 bit address shown as item 329.

A control transfer instruction at this memory address 329 currently contains an old destination address (due to sequence 321 being loaded into page 351) which is now replaced with a new destination address computed as the memory address of the first instruction in the first block 217 in sequence 323 (which happens to be same as the base address of page 355, in this example). As soon as the new destination address is written to the appropriate location in memory, the pre-existing control transfer 313 has been replaced by the new control transfer 343. In this manner, all control transfers identified in the corresponding relocation structures are edited, by use of the base addresses of pages that contain the respective code sequences. After such editing is completed, the edited sequences in pages 351, 353 and 355 form an executable code.

Note that in the example illustrated in FIG. 3D, if each of the control transfers 311-313 and 315 are jumps that use relative addressing, then the corresponding control transfers 341-343 and 345 are related thereto by an integer number (N) times the page size (P), i.e. N*P, where N is the number of intervening pages. For example, the new destination addresses for control transfers 341 and 342 are larger than the old destination addresses of control transfers 311 and 312 by the value P because there is a single intervening page 352. Similarly, the new destination address for control transfer 343 is larger than the old destination addresses of control transfer 313 by 2P, as there are two intervening pages 352 and 354. This relationship between the old and new destination addresses arises from the property that an integral number of pages occur between any two non-contiguous pages, whereas the destination addresses are computed by the code generator assuming the executable code is laid out in contiguous pages.

After editing of the code sequences is completed, as per act 306 (FIG. 3A), the code loader calls appropriate operating system dependent layer function(s) to begin execution of the edited code sequences in pages 351, 353 and 355 (e.g. mprotect calls, icache-calls, etc. . . . ). Eventually, the computer's program counter is set to the first instruction at the base address of the first sequence in page 351, followed by its execution and incrementing of the program counter to the next instruction in page 351 and so on until the above-described 32 bit address is reached (at the end of block 211), at which time control transfers to an instruction at the base address of page 355 and execution continues sequentially in block 217. Note that at the end of block 217, control transfers to an instruction located at the base address of page 353. Therefore, in this manner the executable code is executed, although its location in memory is fragmented and scattered across non-contiguous pages.

Figure 3E:
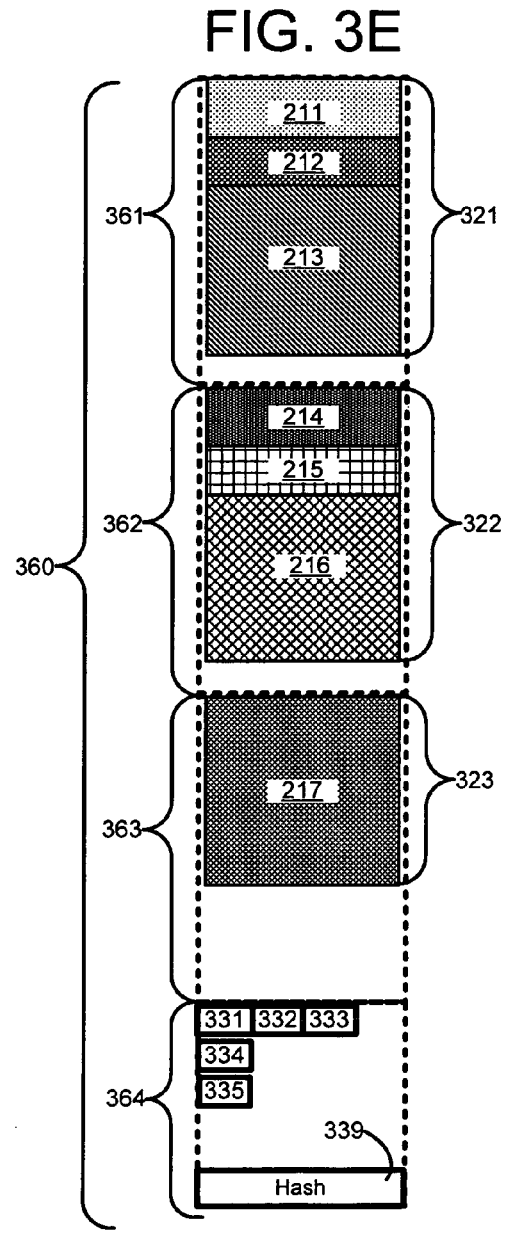
FIGS. 3E and 3F illustrate, in block diagrams, two alternative formats for emitting the relocation structures of FIG. 3C with the sequences of FIG. 3B.
Figure 3F:
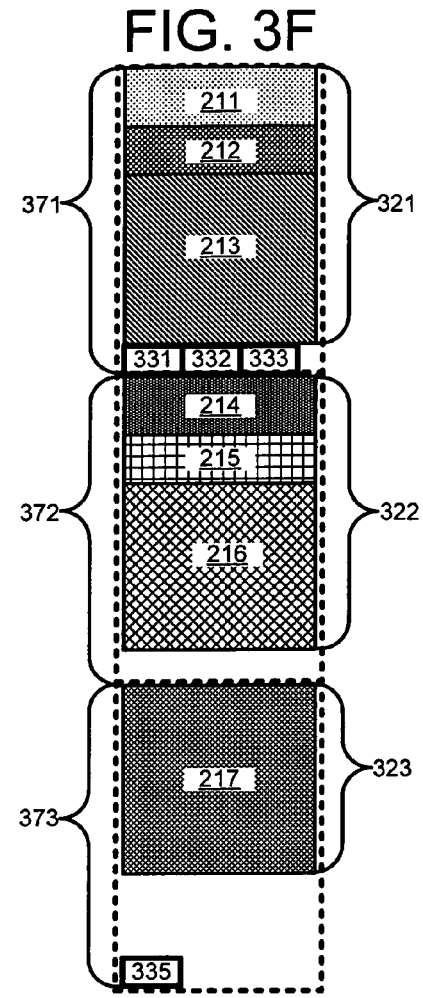
Figure 3G:
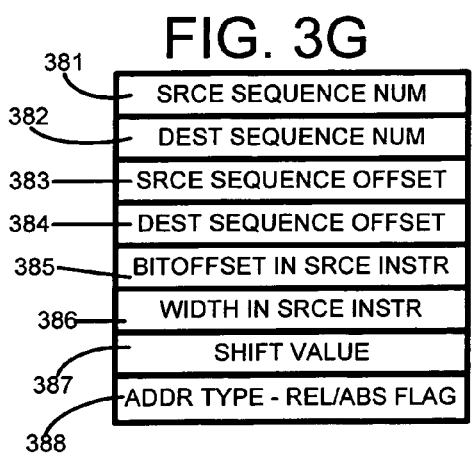
FIG. 3G illustrates one example of a number of fields in a relocation structure of the type illustrated in FIG. 3C.

Some embodiments of a code generator emit a code bundle wherein each sequence is padded with zeros to reach the size of a page, and such a zero-padded sequence is hereinafter called a "code-page". For example, sequences 321-323 (FIG. 3E) when zero padded result in the respective code pages 361-363. In this embodiment, code pages 361-363 have appended thereon a page 364 containing relocation structures 331-335, all of which together are emitted by the code generator in a file 360 that is also referred to herein as a "code bundle." Note that a code bundle may hold additional information such as a hash value 339 (described in the next paragraph), depending on the embodiment. Also depending on the embodiment, a code bundle may have a different structure than shown in FIG. 3E, as discussed next. In one alternative embodiment, a code bundle that is emitted by the code generator contains relocation structures that are required to edit a code sequence listed at the bottom of the corresponding codepage, as illustrated in FIG. 3F.

Note that several embodiments are programmed to store at the end of each code bundle, a hash value 339 of one or more properties, e.g. of the virtual machine and/or of the database management system. Examples of properties that are hashed include the number of bytes in the header word of a Java object (such as the value 4), offset in an array object of a length pointer, offset of a runtime callback function pointer in a data structure of a function, values for different types of objects (e.g. array object v/s class object), maximum number of threads in the virtual machine, page size of pages in shared memory of the database management system etc. Hash value 339 is used in some embodiments to determine whether or not a code bundle can be used directly or needs to be re-generated. The determination to use or not use the code bundle is based on compatibility or incompatibility between assumptions (built into the native code present in the code bundle) (1) during compilation and (2) the current state of VM and/or DBMS. The specific hashing function that is used is not critical.

In some embodiments, a relocation structure is prepared by a code generator of the type described above to contain the information shown in FIG. 3G. Specifically, as discussed above, the relocation structure contains a source sequence number 381 and a source sequence offset 383 that together indicate the precise location of an instruction that transfers control to another sequence. Also as discussed above, the relocation structure contains a destination sequence number 382 and a destination sequence offset 384 that together indicate the target of the control transfer. The relocation structure of this embodiment further includes a field 385 that indicates a bit offset within the source instruction, at which the target is identified by a destination address. As noted above, it is this destination address that is updated prior to execution, if the executable code is loaded into non-contiguous pages (i.e. no update is required if the pages are contiguous). The relocation structure of this embodiment also includes a field 386 that indicates a width of the destination address to be written in the source instruction. The relocation structure further includes a field 387 which indicates a type of shifting operation to be performed on the value to be written as the destination address in the source instruction. The shifting operation is specific to the architecture of the paged memory, and may differ depending on the vendor of the computer (e.g. Intel Corporation v/s Sun Microsystems, Inc.). Finally, a field 388 in the relocation structure of FIG. 3G os a flag which indicates whether the destination address to be written in the source instruction is a relative address or an absolute address.

An illustrative implementation of some embodiments of the invention is illustrated in FIGS. 4A-4D which are described next. Specifically, a compiler parses the byte codes of a class, and generates basic blocks. For example, the compiler may be a just-in-time (JIT) compiler which is invoked when certain a class being executed by the Java interpreter is found to satisfy a predetermined condition (e.g. is used more than a certain number of times). Alternatively, in another example, the compiler may be an ahead-of-time (AOT) compiler. As noted above, a basic block is a straight-line piece of code without any jumps or jump targets in the middle; jump targets, if any, start a block, and jumps end a block. Hence, the compiler generates basic blocks by marking as block boundaries any instructions which either begin or end a block because they either transfer control or accept control from another point. Then, the listing is simply "cut" at each of these points, and basic blocks remain.

Next, a code generator within the compiler generates the machine instructions within each basic block. Thereafter, in acts 401-411 (FIG. 4A), the code generator assembles groups of basic blocks, such that each group (to be used in forming a code sequence) fits within a page. Specifically, in act 401 a current group is initialized (to the first group) and in act 402 the group counter is also initialized (to identify the first group). In act 403 an effective size is set, e.g. to be page size reduced by a fixed estimate of the size of jump table at the bottom of each page. For example, the effective size may be set to 3968 bytes as noted above. Then, in act 404 the current basic block counter is initialized, to identify the first block. Thereafter, in act 405, the code generator computes the total memory space required to hold the machine instructions of the current basic block.

Figure 4A:
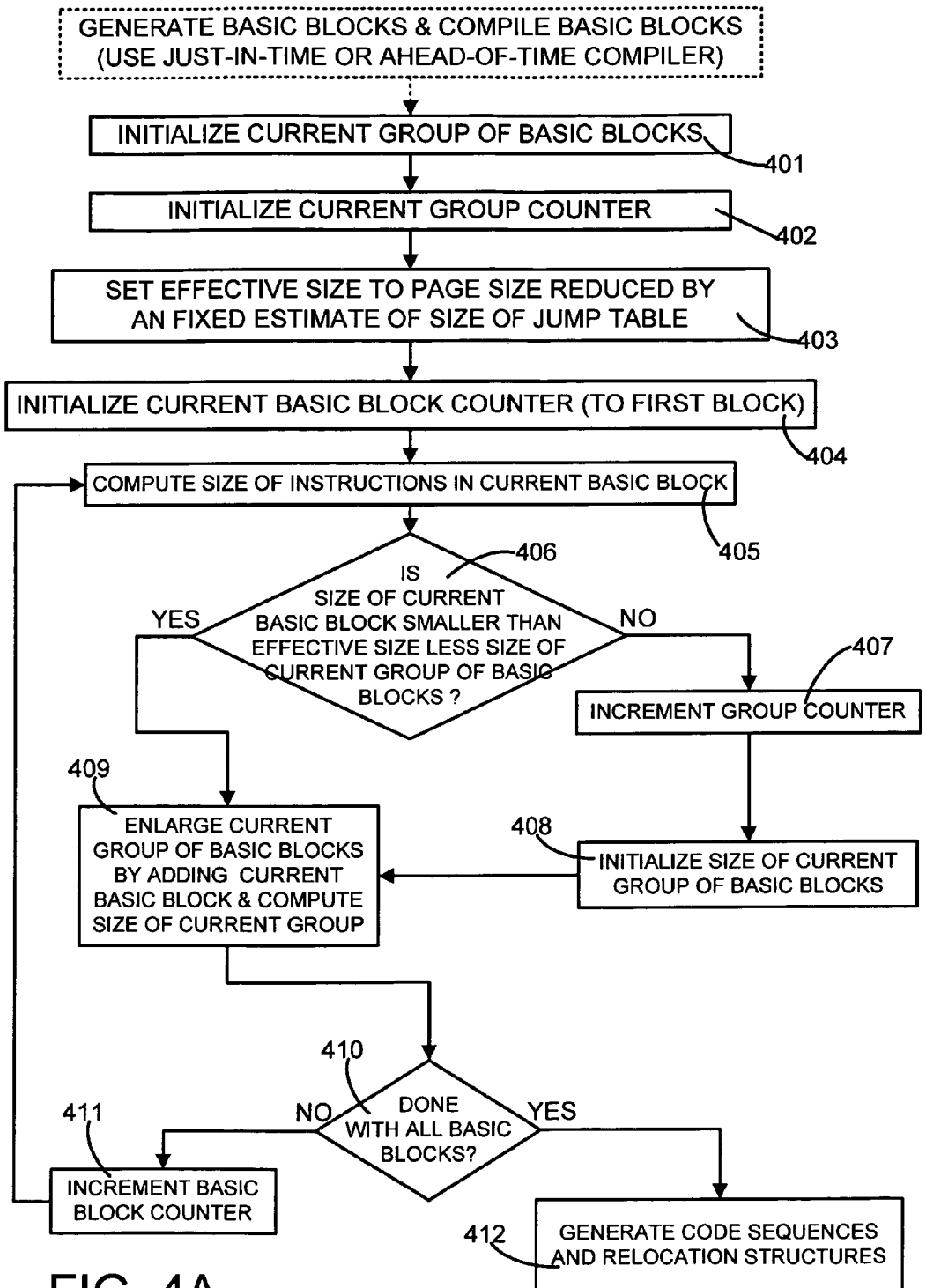
FIG. 4A illustrates, in a flow chart, a method used in some embodiments to form groups of basic blocks, such that each group is sized in accordance with the invention to be less than an effective size of a page in memory.
Figure 4B:
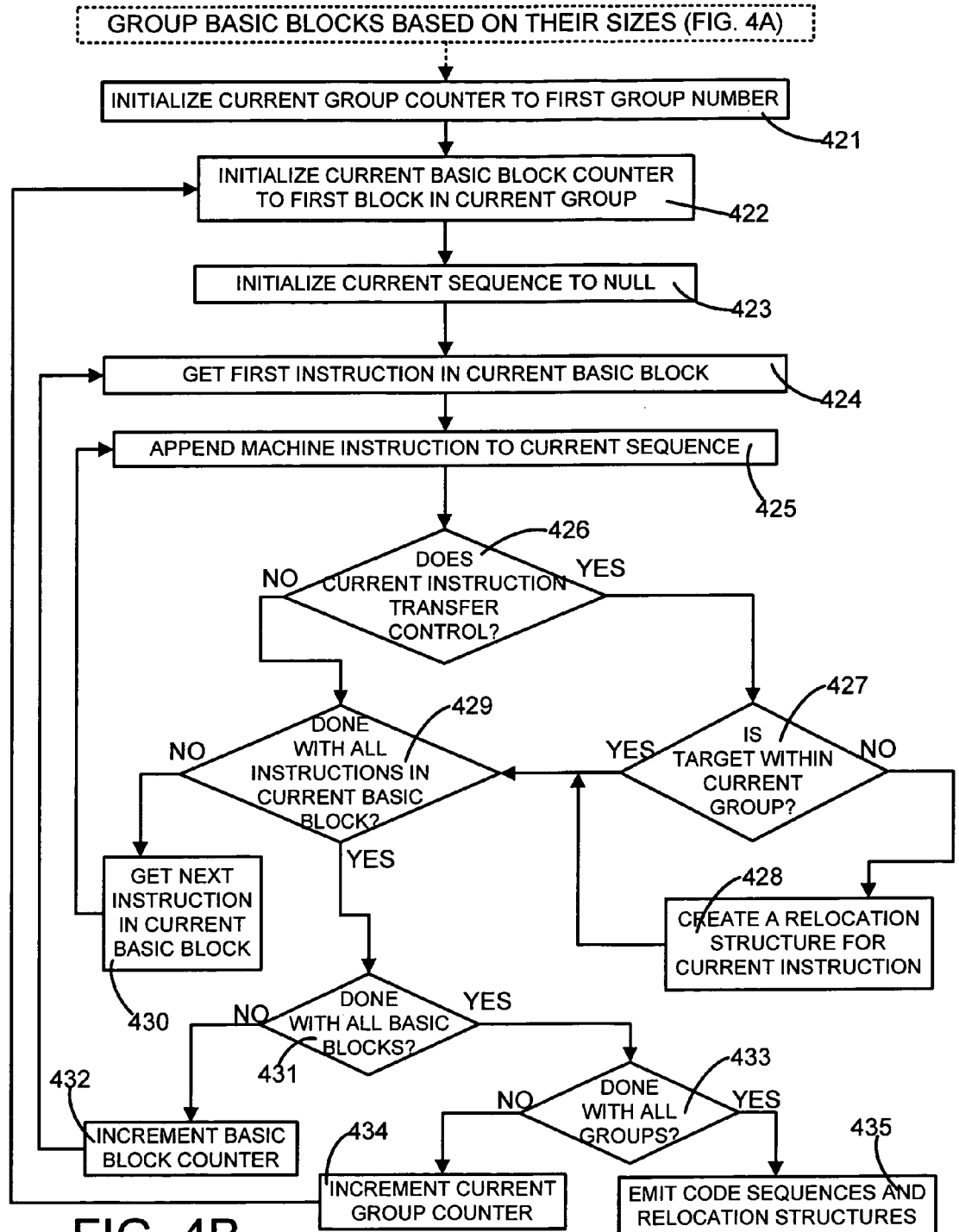
FIG. 4B illustrates, in a flow chart, a method used in several embodiments to repeatedly form a sequence by appending machine instructions in basic blocks of a group and create relocation structure(s) for future use to edit the sequence.
Figure 4D:
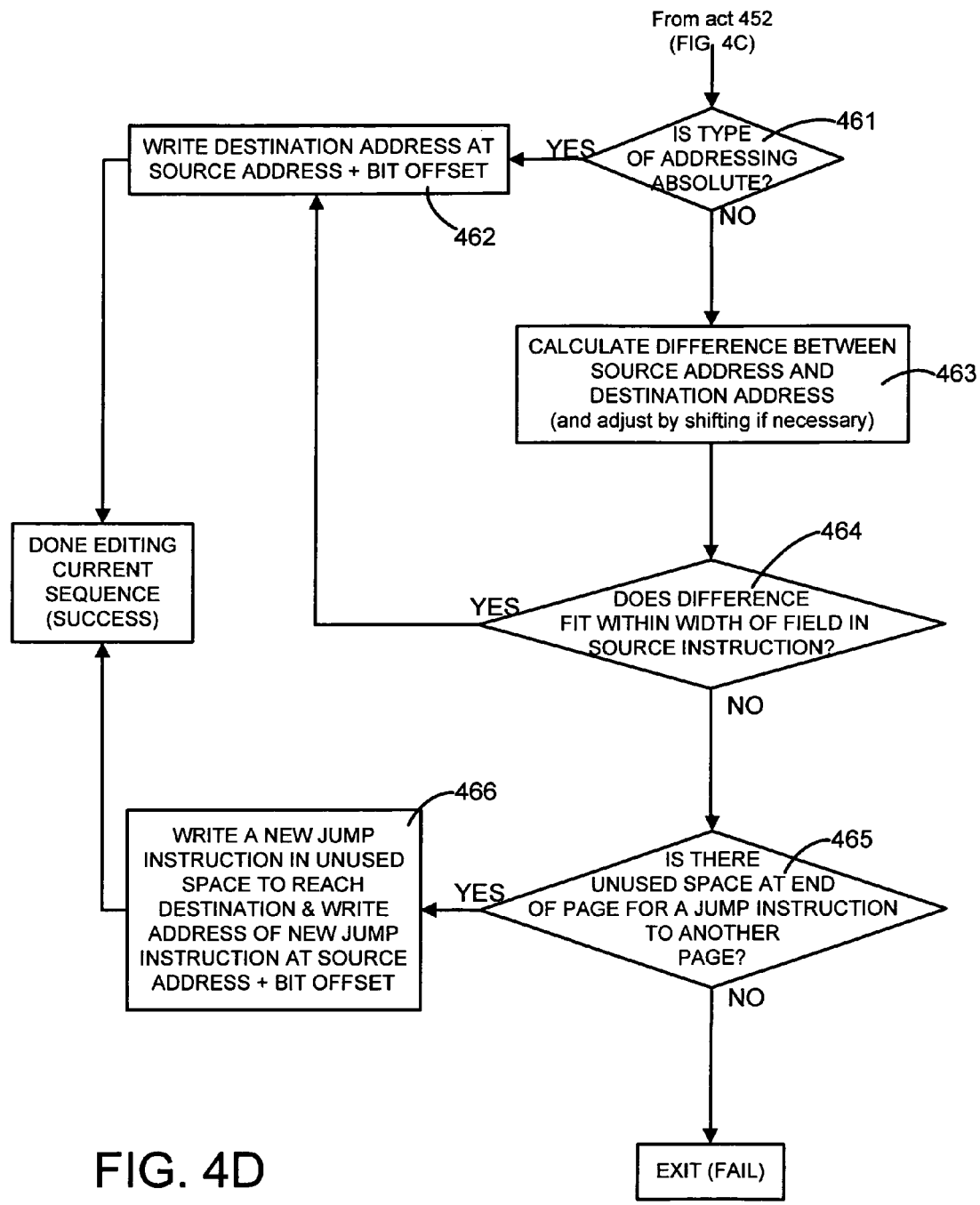
FIG. 4D illustrates, in a flow chart, acts performed in some embodiments to implement act 453 of FIG. 4C.

Next, in act 406 the code generator checks if this size is smaller than the effective size less the size of the current group of basic blocks. If yes, then this basic block fits within a page along with the current group of basic blocks. For this reason, in act 409 the code generator enlarges the current group, by adding to it the current basic block and computing the size of the current group and then proceeds to act 410. In act 406 if the answer is no, then the code generator increments the group counter (in act 407), so as to start a new group of basic blocks. In act 408 the new group is initialized, followed by act 409 (described above). In act 410, the code generator checks if all basic blocks have been processed and if so goes to act 411 to increment the basic block counter and returns to act 405. If in act 410 the answer is yes, i.e. that all basic blocks have been processed then the code generator goes to act 412 to form code sequences and generate relocation structures, as illustrated in FIG. 4B.

In act 421 (FIG. 4B), the code generator initializes a current group counter (to identify the first group). Next, in act 422 the current basic block counter is also initialized to identify the first basic block in the current group. In act 423, the current sequence is initialized (to null). Then, in act 424, the first machine instruction in the current basic block is fetched as the current instruction. In act 425 the current instruction is appended to the current sequence. Next, in act 426 the code generator checks if the current instruction requires relocation and if not goes to act 429 (described below). If yes, then the code generator checks if the target of the current instruction is within the current group of basic blocks and if not then goes to act 428 to create a relocation structure (of the type described above) and thereafter goes to act 429.

In act 429, the code generator checks if it is done with all instructions in the current basic block and if not goes to act 430. In act 430 it fetches the next instruction in the current basic block and then goes to act 425 (described above). In act 429, if the answer is yes, the code generator goes to act 431 to check if all basic blocks have been processed and if not goes to act 432 to increment the basic block counter and goes to act 424 (described above). If the answer is yes in act 431, the code generator goes to act 433 to check if it is done with processing all groups and if not goes to act 434 to increment the current group counter and goes to act 422 (described above). In act 433, if the code generator is done with all groups, then it goes to act 435 to emit the code sequences and relocation structures.

A code loader within a virtual machine's run time environment loads the code sequences into memory as illustrated in acts 441-446 (FIG. 4C) and thereafter in-situ edits the loaded code sequences in acts 451-455. Specifically, in act 441 the code sequences and relocation structures are copied into temporary memory of the current process. Next, in act 442 a current sequence counter is initialized. Thereafter, in act 443 a page is allocated from a shared memory heap, followed by copying of the current code sequence into the allocated page in act 444. Next, in act 445, the code loader checks if it is done with all sequences and if not goes to act 446. In act 446, the code loader increments the current sequence counter and goes to act 443 (described above).

In act 445 if the code loader finds the answer to be yes, then it proceeds to act 451 to initializes a current relocation counter (to identify the first relocation structure). Then, in act 452, the base addresses are used to calculate the source address and the destination address (in allocated memory) for the control transfer instruction identified in the current relocation structure. Next, in act 453, the code loader edits the code sequence in memory, i.e. edits the control transfer instruction at the source address. The specific edits that are made depend on information obtained from the relocation structure, such as the type of addressing (relative/absolute) and shift value. One illustrative implementation of this act 453 is performed by acts 461-466 shown in FIG. 4D and described below. After act 453, the code loader checks if it is done processing all relocations in the code bundle in act 454 and if not it goes to act 455. In act 455, the code loader increments the current relocation counter and goes to act 452 (described above). In act 454 if the answer is yes, then the code loader invokes the appropriate operating system functions to execute the executable code (which has been edited in-situ).

In act 461, the code loader checks if the type of addressing of the current instruction is absolute (as indicated in the respective relocation structure) and if so, goes to act 462 and if not it goes to act 463. In act 462, the code loader writes the destination address at the source address plus the bit offset (as indicated in the respective relocation structure), and at this stage the editing of this instruction has been completed successfully. In act 463 the code loader calculates the difference between the source and destination addresses for the control transfer (and if necessary adjusts this difference by shifting by the appropriate number of bits as indicated in the shift value field of the relocation structure), and thereafter goes to act 464. In act 464, the code loader checks if the difference fits within the width for the destination address in the source instruction (which width is also indicated in the relocation structure), and if so, goes to act 462 (described above) and if not it goes to act 465. In act 465, the code loader checks if there is enough space available at the end of the current page to hold the jump instruction to transfer control to the target and if so, goes to act 466 and if not it simply fails to load the executable code.

In act 466, the code loader implements a two-part jump, wherein a first jump instruction transfers control to the a region at the bottom of the page and a second jump instruction to the target is written in that region. In several such embodiments, the first jump instruction (which is emitted by the compiler) must be able to address this region (i.e. a jump instruction which addresses a distance smaller than a page size cannot be used by the compiler). The code loader overwrites the target address in the first jump instruction to be the location of the second jump instruction, and further writes (emits) the second jump instruction to a distant page. Furthermore, the address of this second jump instruction is written at the source address plus the bit offset (as indicated in the relocation structure), and at this stage the editing of this instruction has been completed successfully. Note that the type of the new jump instruction's address (relative/absolute) which is written at the source address depends on the flag in the relocation structure. Note further that in some embodiments, instead of exiting with a failure code along the "no" branch from act 465, one or more additional attempts are made as follows. Specifically, the current page is released and a new page is allocated, and the base address of the newly allocated page is checked to see if a difference (as per act 463) is of a sufficiently small size and if so the "yes" branch is eventually taken from act 464. In one embodiment, such release and allocation are performed a predetermined number of times (e.g. 3 times), before exiting with a failure code (i.e. that the code loading failed—with the result that the Java byte codes continue to be interpreted).

Figure 5:
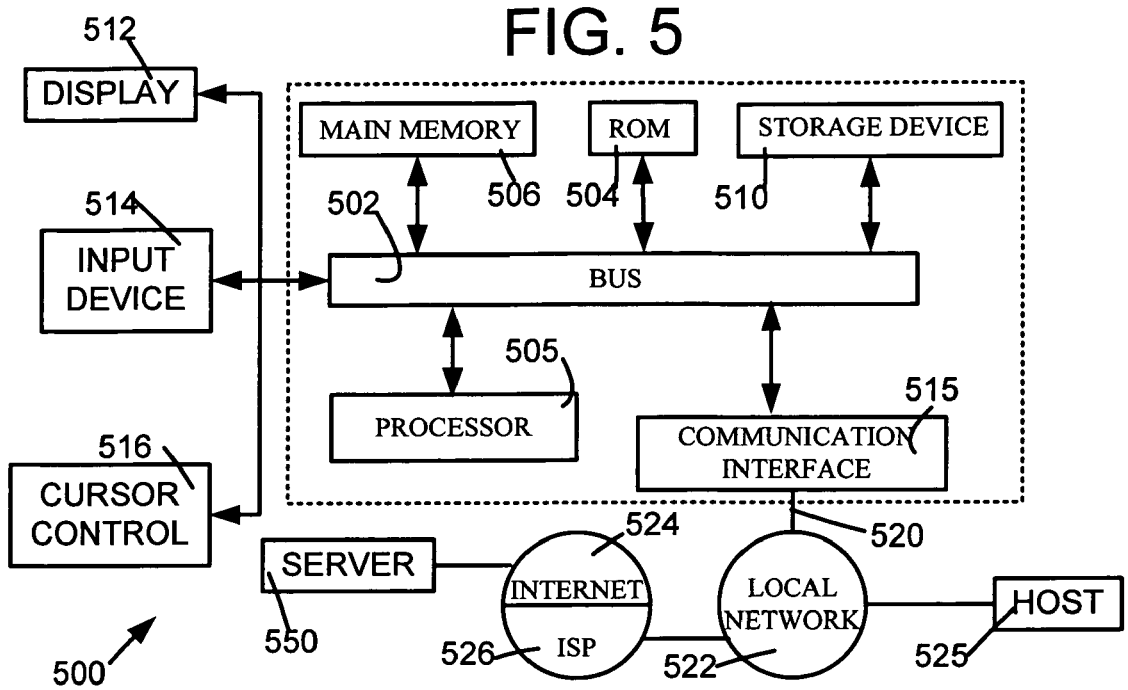
FIG. 5 illustrates, in a high level block diagram, hardware included in a computer that may be used to perform the methods of FIGS. 4A-4D in some embodiments of the invention.

A code generator and a code loader of the type described above can be implemented by use of hardware that forms a computer system 500 as illustrated in FIG. 5. Specifically, computer system 500 includes a bus 502 (FIG. 5) or other communication mechanism for communicating information, and a processor 505 coupled with bus 502 for processing information. Computer system 500 also includes a main memory 506, such as a random access memory (RAM) or other dynamic storage device, coupled to bus 502 for storing information and instructions to be executed by processor 505. Main memory 506 also may be used for storing temporary variables or other intermediate information during execution of instructions to be executed by processor 505. Computer system 500 further includes a read only memory (ROM) 504 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, code bundles are used by computer system 500 in response to processor 505 executing one or more sequences of one or more instructions contained in main memory 506. Such instructions may be read into main memory 506 from another computer-readable medium, such as storage device 510. Execution of instructions contained in main memory 506 causes processor 505 to perform the process steps described herein. In alternative embodiments, hard-wired circuitry may be used in place of or in combination with software instructions to implement the invention of the type illustrated in FIGS. 4A-4C. Thus, embodiments of the invention are not limited to any specific combination of hardware circuitry and software.

The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more code bundles to processor 505 for execution. For example, the code bundles may initially be carried on a computer readable storage medium, such as a magnetic disk or an optical disk of a remote computer. The remote computer can load the code bundles into its dynamic memory and send the code bundles over a computer readable transmission medium such as a telephone line using a modem. A modem local to computer system 500 can receive the code bundles on the telephone line and use an infra-red transmitter to convert the code bundles to an infra-red signal. An infra-red detector can receive the code bundles carried in the infra-red signal and appropriate circuitry can place the code bundles on bus 502. Bus 502 carries the code bundles to main memory 506, in which processor 505 edits the sequences followed by execution of the instructions contained therein. The instructions held in main memory 506 may optionally be stored on storage device 510 either before or after execution by processor 505.

Computer system 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 515 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented. In any such implementation, communication interface 515 sends and receives electrical, electromagnetic or optical signals that carry digital data streams representing various types of information.

Network link 520 typically provides data communication through one or more networks to other data devices. For example, network link 520 may provide a connection through local network 522 to a host computer or to data equipment operated by an Internet Service Provider (ISP) 526. ISP 526 in turn provides data communication services through the world wide packet data communication network 524 now commonly referred to as the "Internet". Local network 522 and network 524 both use electrical, electromagnetic or optical signals that carry digital data streams. The signals through the various networks and the signals on network link 520 and through communication interface 515, which carry the digital data to and from computer system 500, are exemplary forms of carrier waves transporting the information.

Computer system 500 can send messages and receive data, including program code, through the network(s), network link 520 and communication interface 515. In the Internet example, a server 530 might transmit a code bundle through Internet 524, ISP 526, local network 522 and communication interface 515. In accordance with the invention, one such downloaded code bundle contains sequences and relocation structures as described herein. The received code bundle may be executed by processor 505 as it is received, and/or stored in storage device 510, or other non-volatile storage for later execution. In this manner, computer system 500 may obtain the generated code bundle in the form of a carrier wave.

Numerous modifications and adaptations of the embodiments described herein will be apparent to the skilled artisan in view of the disclosure.

For example, some embodiments use basic blocks to identify code sequences that fit within a page, so that each code sequence contains an integral number of basic blocks (i.e. each code sequence ends at the last instruction in a basic block). However, other embodiments do not use basic blocks, and in such other embodiments code sequences of the type described above do not end at basic block boundaries. Instead, basic blocks which span across code sequences are modified by adding at least one control transfer instruction at the end of a code sequence within each basic block.

One illustrative embodiment of the type described herein has the following advantages: (1) pages executable code as required by the environment without adding complicated analyses to the compiler to ensure correctness, (2) avoids adding direct runtime costs due to cross-page transfer (the word "direct" is used here because this embodiment does not add extra control-transfers, although just the act of paging code could cause changes in instruction-cache behavior), (3) has a low cost of reloading in the face of the volatile heap (if the heap is aged out and reloaded (at a likely different address), no recompilation is necessary, and (4) is platform generic (because if the size of a page differs between platforms, such a difference is easily implemented by changing a single constant).

Accordingly numerous such modifications and adaptations are encompassed by the attached claims.

What is claimed is:

1. A computer-implemented method of grouping basic blocks for generation of executable code, the method comprising:
    computing a size of a basic block based on a set of machine instructions therein;
    wherein the machine instructions in the set are to execute one after another serially with no transfer of control until a last instruction in the set;
    enlarging a group of basic blocks to include said basic block when said size is smaller than a difference between a predetermined size and a size of said group and otherwise adding said basic block to another group;
    repeating the computing and the enlarging, with at least another basic block;
    forming in a memory located within a computer several sequences of machine instructions corresponding to several groups including said group and said another group; and
    creating in said memory at least one structure by including therein at least a first identifier of a machine instruction which transfers control out of one of the sequences and a second identifier of a target of said machine instruction.

2. The computer-implemented method of claim 1 wherein:
    the computer performs compilation to generate the executable code in a just-in-time manner; and
    during said compilation in said just-in-time manner, the computer performs each of said computing, said enlarging, said repeating the computing and the enlarging, said forming, and said creating.

3. The computer-implemented method of claim 1 wherein:
    the structure comprises a flag indicative of whether said target of said machine instruction is addressed absolutely or relatively.

4. The computer-implemented method of claim 1 wherein said computer is hereinafter "first" computer, and wherein:
    the first computer performs each of said computing, said enlarging, said repeating the computing and enlarging, said forming, and said creating;
    a paged memory is present in a second computer different from the first computer; and
    the method further comprises the second computer:
    loading said several sequences into the paged memory of the second computer;
    using said at least one structure to edit the executable code in the paged memory; and
    executing the executable code from the paged memory.

5. The computer-implemented method of claim 1 wherein:
    a number of structures including said structure are emitted in association with said several sequences; and
    every instruction that transfers control between any two sequences is identified in one of the structures being emitted.

6. The computer-implemented method of claim 1 wherein:
    said several sequences comprises at least three sequences.

7. A computer-implemented method of bundling up for use in a paged memory, a plurality of machine instructions, the method comprising:
    repeatedly appending a group of machine instructions one after another to form a sequence while the sequence has a first size smaller than a second size of a page in the paged memory;
    wherein a difference between the first size and the second size is larger than a result of multiplying a predetermined size with a number of machine instructions in said sequence which transfer control out of said sequence;
    creating at least one structure corresponding to a machine instruction in said sequence that transfers control out of said sequence;
    wherein said at least one structure comprises at least an identifier of said machine instruction that transfers control;
    repeating said appending and said creating, to form a plurality of additional sequences and structures; and
    transmitting through a network, a bundle comprising all sequences resulting from said appending and all structures resulting from said creating.

8. The computer-implemented method of claim 7 wherein said at least one structure further comprises:
    a bit offset within said machine instruction at which a target is identified by a destination address; and
    a width of said destination address within said machine instruction.

9. The computer-implemented method of claim 7 wherein said at least one structure comprises:
    an identifier of said sequence.

10. The computer-implemented method of claim 7 further comprising:
    using a Just-In-Time (JIT) compiler to compile the plurality of machine instructions.

11. The computer-implemented method of claim 7 further comprising:

using an ahead-of-time compiler to compile the plurality of machine instructions.

12. A non-transitory computer-readable storage medium encoded with instructions to group basic blocks for generation of executable code, the instructions comprising:
    instructions to compute a size of a basic block based on a set of machine instructions within the basic block;
    wherein the machine instructions in the set are to execute one after another serially with no transfer of control until a last instruction in the set;
    instructions to enlarge a group of basic blocks to include said basic block when said size is smaller than a difference between a predetermined size and a size of said group and otherwise to add said basic block to another group;
    instructions to repeat execution of the instructions to compute and enlarge, with at least another basic block;
    instructions to form in a memory located within a computer several sequences of machine instructions corresponding to several groups including said group and said another group; and
    instructions to create in said memory at least one structure by including therein at least a first identifier of a machine instruction which transfers control out of one of the sequences and a second identifier of a target of said machine instruction.

13. The non-transitory computer-readable storage medium of claim 12 wherein:
    said at least one structure comprises a flag indicative of whether said target of said machine instruction is addressed absolutely or relatively.

14. The non-transitory computer-readable storage medium of claim 12 wherein:
    said at least one structure is comprised in a plurality of structures that are emitted in association with said several sequences; and
    every instruction that transfers control between any two sequences is identified in one of the plurality of structures.

15. A non-transitory computer-readable storage medium encoded with a plurality of sequences and at least one structure resulting from performing a method, the method comprising:
    computing a size of a basic block based on a set of machine instructions within the basic block;
    wherein the machine instructions in the set are to execute one after another serially with no transfer of control until a last instruction in the set;
    enlarging a group of basic blocks to include said basic block when said size is smaller than a difference between a predetermined size and a size of said group and otherwise to add said basic block to another group;
    repeating said computing and said enlarging, with at least another basic block;
    forming in a memory located within a computer said plurality of sequences of machine instructions corresponding to several groups including said group and said another group; and
    creating in said memory said at least one structure by including therein at least a first identifier of a machine instruction which transfers control out of one of the sequences and a second identifier of a target of said machine instruction.

16. The non-transitory computer-readable storage medium of claim 15 wherein:
    said at least one structure comprises a flag indicative of whether said target of said machine instruction is addressed absolutely or relatively.

17. The non-transitory computer-readable storage medium of claim 15 wherein:
    said at least one structure is comprised in a plurality of structures that are emitted; and
    every instruction that transfers control between any two sequences is identified in one of the plurality of structures.

18. The computer-implemented method of claim 7 wherein:
    a first computer performs at least said creating; and
    the paged memory is present in a second computer different from the first computer.

19. A non-transitory computer-readable storage medium encoded with software that on execution causes a computer to perform a method to bundle up for use in a paged memory, a plurality of machine instructions, the method comprising:
    repeatedly appending a group of machine instructions one after another to form a sequence while the sequence has a first size smaller than a second size of a page in the paged memory;
    wherein a difference between the first size and the second size is larger than a result of multiplying a predetermined size with a number of machine instructions in said sequence which transfer control out of said sequence;
    creating at least one structure corresponding to a machine instruction in said sequence that transfers control out of said sequence;
    wherein said at least one structure comprises at least an identifier of said machine instruction that transfers control;
    repeating said appending and said creating, to form a plurality of additional sequences and structures; and
    transmitting through a network, a bundle comprising all sequences resulting from said appending and all structures resulting from said creating.

20. The non-transitory computer-readable storage medium of claim 19 wherein said at least one structure further comprises:
    a bit offset within said machine instruction at which a target is identified by a destination address; and
    a width of said destination address within said machine instruction.

21. The non-transitory computer-readable storage medium of claim 19 wherein said at least one structure comprises:
    an identifier of said sequence 22. The non-transitory computer-readable storage medium of claim 19 wherein the method further comprises:
    using a Just-In-Time (JIT) compiler to compile the plurality of machine instructions.

23. The non-transitory computer-readable storage medium of claim 19 wherein the method further comprises:
    using an ahead-of-time compiler to compile the plurality of machine instructions.

24. The non-transitory computer-readable storage medium of claim 19 wherein said computer is hereinafter "first" computer, and wherein:
    the first computer performs at least said creating; and
    the paged memory is present in a second computer different from the first computer.

* * * * *

UNITED STATES PATENT AND TRADEMARK OFFICE
CERTIFICATE OF CORRECTION

PATENT NO. : 8,341,609 B2
APPLICATION NO. : 11/698638
DATED : December 25, 2012
INVENTOR(S) : Lee et al.

Page 1 of 1

It is certified that error appears in the above-identified patent and that said Letters Patent is hereby corrected as shown below:

On Title Page 2, in column 2, under "Other Publications", line 2, delete "pages" and insert -- pages. --, therefor.

On Title Page 2, in column 2, under "Other Publications", line 2, delete "pages" and insert -- pages. --, therefor.

On Title Page 2, in column 2, under "Other Publications", insert -- Scott McFarling "Program Optimization for Instruction Caches", [Online], 1989, Pages : 183-191, [Retrieved from Internet on 09/01/2012], <http://citeseerx.ist.psu.edu/viewdoc/download?doi=10.1.1.103.538&rep=rep1&type=pdf>* --.

On Title Page 2, in column 2, under "Other Publications", insert -- Stefan Steinke et al., "Assigning Program and Data Objects to Scratchpad for Energy Reduction", [Online], 2002, Pages: 1-7, [Retrieved from Internet on 09/01/2012], <http://www.date-conference.com/archive/conference/proceedings/PAPERS/2002/DATE02/PDFFILES/04E_3.pdf.* --.

On Title Page 2, in column 2, under "Other Publications", insert -- Chris H. Perleberg, "Branch Target Buffer Design", [Online], 1989, Pages:1-61, [Retrieved from Internet on 09/01/2012], <http://www.eecs.berkeley.edu/Pubs/TechRpts/1989/CSD-89-553.pdf>* --.

In the Specifications:

In column 6, line 31, delete "class'" and insert -- class --, therefor.

In column 8, line 54, delete "os" and insert -- is --, therefor.

In the Claims:

In column 16, line 48, in Claim 21, delete "sequence" and insert -- sequence. --, therefor.

Signed and Sealed this
Twenty-first Day of May, 2013

Teresa Stanek Rea
*Acting Director of the United States Patent and Trademark Office*